UNITED STATES PATENT OFFICE.

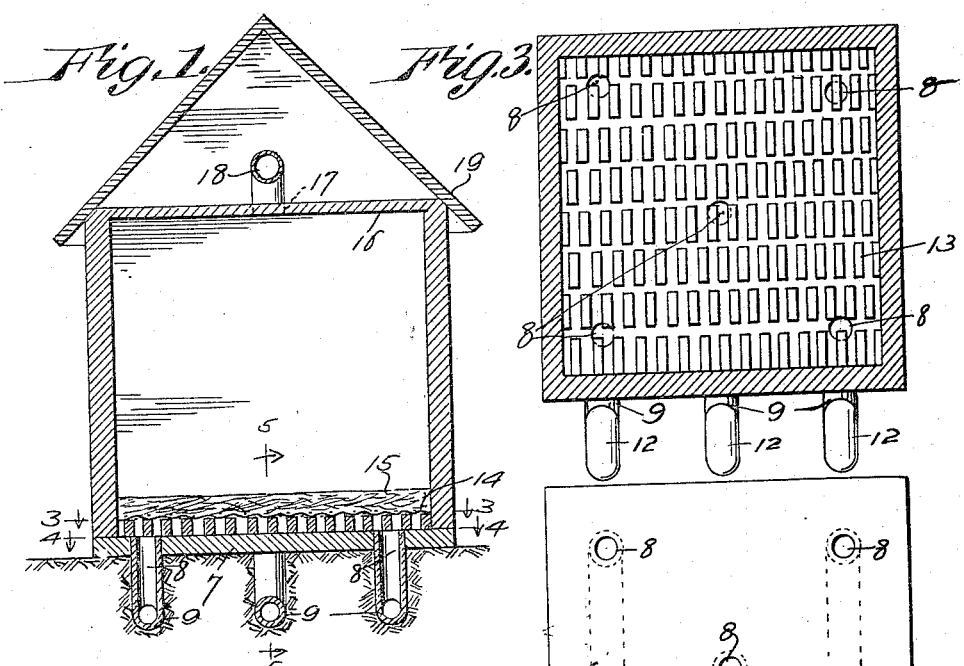

MACK DANIEL STOKER, OF APPLEBY, TEXAS.

STORAGE-BIN.

1,226,025.  Specification of Letters Patent.  Patented May 15, 1917.

Application filed March 6, 1916. Serial No. 82,515.

*To all whom it may concern:*

Be it known that I, MACK D. STOKER, a citizen of the United States of America, and resident of Appleby, in the county of Nacogdoches and State of Texas, have invented certain new and useful Improvements in Storage-Bins, of which the following is a specification.

This invention relates to storage warehouses and particularly to means for storing vegetation to prevent deterioration, due to heating and sweating as is a common cause of the decay of potatoes and the like.

An object, therefore, of this invention is to provide means whereby air is permitted to circulate through the potatoes while they are in storage, the air so circulating being effective to prevent damage, due to the heating.

In carrying out my invention, I provide means whereby the heat produced when potatoes are confined for storage will prove effective in setting up current of air so that the said current of air is automatically induced according to the degree of heat present in the mass of potatoes.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a vertical sectional view of a storage house embodying the invention;

Fig. 2 illustrates a view in elevation on a reduced scale;

Fig. 3 illustrates a sectional view on the line 3—3 of Fig. 1;

Fig. 4 illustrates a sectional view on the line 4—4 of Fig. 1; and Fig. 5 illustrates a sectional view on a line corresponding with the line 5—5 of Fig. 1.

In these drawings, 7 denotes the floor or bottom of the bin. The floor 7 has a series of apertures 8 to which pipes 9 are connected, the said pipes extending horizontally and then upwardly into the said apertures.

The pipes 9 are of peculiar construction in that they lie horizontally in trenches under the floor, the said pipes then extend upwardly as at 11 and are curved as at 12, so that the intake openings of the pipes are toward the bottom or toward the surface of the ground on which the floor is supported.

Internally, the bin or storage house is provided with a plurality of blocks of suitable material such as 13, the said blocks being spaced apart to form interstices through which air may circulate. The blocks constitute supports for a wire netting or screen 14 of such mesh as to support hay or other vegetations or fibrous material, the same being shown at 15 on the drawing.

The ceiling or top 16 of the bin has an aperture 17 to which a pipe 18 is connected, the said pipe extending to the exterior of the structure so that when the circulation of air is effected, it will serve to carry off the air rising in the structure.

A roof 19 is here shown and this roof may have open gables or they may be closed according to the requirements of practice, but if closed, the pipe 18 may of course extend through one end of the roof.

As the purpose of the invention has been stated, it will be apparent that when vegetation in the bin or storage house generates heat, the said heat will rise and thus cause air to be drawn in through the pipes, thereby creating a current of air which will be effective to prevent sweating as stated. The air will not circulate when the temperature of the vegetation is normal.

I claim:

In a bin, a housing with a floor, supports on the floor in spaced relation to each other at their sides and ends, permitting transverse and longitudinal ducts, a screen on the said supports, pipes extending upwardly through the said floor and having their outer ends terminating in goose neck extensions with the openings facing the earth, and a layer of fibrous material on the said screen.

In testimony whereof, I affix my signature in the presence of two witnesses.

MACK DANIEL STOKER.

Witnesses:
LEE GASTON,
R. P. BLOUNT.

Copies of this patent may be obtained for five cents each, by addressing the "Commissioner of Patents, Washington, D. C."